United States Patent
Chappalli et al.

(10) Patent No.: US 10,187,622 B1
(45) Date of Patent: Jan. 22, 2019

(54) IMAGE DATA FORMAT CONVERSION SYSTEMS AND METHODS

(71) Applicant: Apple Inc., Cupertino, CA (US)

(72) Inventors: Mahesh B. Chappalli, San Jose, CA (US); Peter F. Holland, Los Gatos, CA (US); David L. Bowman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/699,481

(22) Filed: Sep. 8, 2017

(51) Int. Cl.
*G06T 1/20* (2006.01)
*H04N 1/60* (2006.01)
*H04N 9/64* (2006.01)

(52) U.S. Cl.
CPC .............. *H04N 9/646* (2013.01); *G06T 1/20* (2013.01); *H04N 1/6016* (2013.01)

(58) Field of Classification Search
CPC ......... H04N 9/646; H04N 1/6016; G06T 1/20
See application file for complete search history.

(56) References Cited

U.S. PATENT DOCUMENTS

| | | | | |
|---|---|---|---|---|
| 2003/0223634 A1* | 12/2003 | Gallagher | ............ | H04N 1/6058 382/167 |
| 2013/0328907 A1* | 12/2013 | Ballestad | ............. | H04N 1/6027 345/590 |
| 2014/0292750 A1 | 10/2014 | Lipton et al. | | |
| 2016/0307540 A1 | 10/2016 | Holland et al. | | |
| 2017/0048520 A1* | 2/2017 | Seifi | ...................... | H04N 19/172 |

FOREIGN PATENT DOCUMENTS

EP 0489552 A2 12/1990

* cited by examiner

*Primary Examiner* — Michael E Teitelbaum
(74) *Attorney, Agent, or Firm* — Feltcher Yoder PC

(57) ABSTRACT

Systems and methods for improving operational flexibility of a display pipeline coupled to a display panel that facilitates display of an image by controlling luminance of a display pixel based on display image data. The display pipeline includes a format convert block that receives source image data that indicates target luminance of the display pixel using a source format; determines a color scaling factor associated with a color component in the source image data based on the source format; and generates internal image data that indicates target luminance of the display pixel using an internal format based on application of the color scaling factor to the source image data. Additionally, the display pipeline includes an image data processing block coupled to the format convert block, which processes the internal image data before the display image data is generated to facilitate improving perceived image quality when the image is displayed.

14 Claims, 8 Drawing Sheets

| 88 | FORMAT CONVERSION LOOK-UP-TABLE (LUT) | | | | |
|---|---|---|---|---|---|
| | | 8-BIT αRGB | 10-BIT αRGB | 8-BIT YCbCr | 10-BIT YCbCr |
| 92A | α SCALING FACTOR | $(2^{10}-1)/(2^8-1)$ | 0 | NA | NA |
| 92B | RGB OFFSET VALUE | 0 | −384 | NA | NA |
| 92C | RGB SCALING FACTOR | $2^{24}/(2^8-1)$ | $2^{24}/510$ | NA | NA |
| 92D | Y SCALING FACTOR | NA | NA | $2^{24}/(2^8-1)$ | $2^{24}/(2^{10}-1)$ |
| 92E | C SCALING FACTOR | NA | NA | $2^{24}/2^8$ | $2^{24}/2^{10}$ |
| | | 90A | 90B | 90C | 90D |

IMAGE DATA FORMAT CONVERSION SYSTEMS AND METHODS

BACKGROUND

The present disclosure relates generally to electronic displays and, more particularly, to image data processing before a corresponding image is displayed on an electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use electronic displays to present visual representations of information by displaying images, for example, in one or more image frames. Such electronic devices may include computers, mobile phones, portable media devices, tablets, televisions, virtual-reality headsets, and vehicle dashboards, among many others. To display an image, an electronic display may control light emission from its display pixels based at least in part on image data, which indicates target characteristics of the image. For example, image data may indicate target luminance at various points (e.g., image pixels) in the image.

In some instances, image data corresponding with an image to be displayed on an electronic display may be generated by an image data source. Additionally, in some instances, image data sources may generate image data using various image data formats, which indicate target characteristics using different representations. For example, a first image data source may generate image data in a luma-chroma-chroma (YCbCr) format that indicates a luma component, a blue-chroma component, and a red-chroma component each using an 8-bit fixed point representation. On the other hand, a second image data source may generate image data in an αRGB format that indicates an alpha component, a red component, a green component, and a blue component each using a 16-bit floating point representation.

To facilitate improving perceived image quality, a display pipeline may process image data received from an image data source before the image data is used to display a corresponding image. Additionally, to facilitate improving operational flexibility, the display pipeline may be implemented (e.g., designed) to be compatible with multiple different image data formats. However, in some instances, compatibility of the display pipeline with various image data formats may be dependent on implementation, for example, since different image data formats may indicate target characteristics of the image using different representations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving operational flexibility of a display pipeline that process image data before display of a corresponding image on an electronic display. To display an image, an electronic display may control light emission from its display pixels based at least in part on image data that indicates target characteristics of the image. The target characteristics may be indicated using various image data formats, such as using an alpha-red-green-blue (αRGB) format or a luma-chroma-chroma (YCbCr) format.

Generally, an image data source may generate image data in a source format. However, in some instances, image data sources may generate source image data using different source formats. Moreover, in some instances, different image data formats may indicate image data components using different representations.

Nevertheless, to facilitate improving perceived image quality, image data may be processed, for example, by a display pipeline before being using to display a corresponding image on an electronic display. In some instances, a display pipeline may be implemented to be compatible with multiple different source formats. However, compatibility of a display pipeline with an image data format may be dependent on implementation of the display pipeline—particularly when implemented using hardware circuitry. In fact, since processing of image data indicated using different formats may vary, expanding format compatibility of a display pipeline may affect implementation associated cost, such as component count in the display pipeline, physical footprint of the display pipeline, and/or manufacturing steps used to implement the display pipeline.

Accordingly, the present disclosure provides techniques to improve operational flexibility of a display pipeline with reduced implementation associated cost, for example, by enabling the display pipeline to process multiple different source formats using the same pipeline path (e.g., circuitry). To facilitate improving operational flexibility, in some embodiments, the display pipeline may convert image data from any one of multiple source formats into an internal format before subsequent processing. By converting into an internal format, subsequent portions of the display pipeline may process image data received with different source formats in a similar manner.

In some embodiments, the display pipeline may convert an image data component from a source format to the internal format by mapping a first value (e.g., source) range associated with the source format into a second value (e.g., internal) range associated with the internal format, for example, by scaling and/or offsetting the image data component. To facilitate indicating wide color gamut (e.g., outside sRGB color gamut) content, in some embodiments, a source range for an image data component may be selected from an extended source range and an internal range for color component image data may be selected from a corresponding extended internal range. In such embodiments, the source range and the internal range may be used indicate standard color gamut content while portions of the extended source range outside the source range and portions of the extended internal range outside the internal range may be used indicate wide color gamut content.

Additionally, in some embodiments, an offset value and/or a scaling factor to be applied to an image data component may be determined based at least in part on difference between a corresponding source range and a corresponding internal range. For example, the offset value to an image data component may be determined based at least in part on difference between a source lower limit of a corresponding source range and an internal lower limit of a corresponding internal range. In other words, the offset value may be determined to account for biasing differences applied when interpreting the source format and the internal format. By applying the offset value, the image data component may be adjusted such that the source lower limit matches the internal lower limit.

Additionally, the scaling factor to be applied to an image data component may be determined to account for difference between span of the corresponding source range and span of the corresponding internal range. For example, when the source lower limit matches the internal lower limit (e.g., after applying the offset value), the scaling factor may be determined based at least in part on ratio of an internal upper limit of the corresponding internal range relative to a source upper limit of the corresponding source range. By applying the scaling factor (e.g., after the offset value), the image data component may be adjusted such that the source upper limit matches the internal upper limit.

In this manner, a display pipeline may convert image data components from various source formats into the internal format. In some embodiments, the display pipeline may algorithmically determine offset values and/or scaling factors, for example, based at least in part on characteristics (e.g., included image data components, implicit biasing, an extended source range, a source range, and/or bit allocation) of a source format and target characteristics (e.g., supported image data components, an extended internal range, an internal range and/or bit allocation) of the internal format. Additionally or alternatively, the offset values and/or scaling factors may be predetermined, for example, by a design device and stored via one or more conversion look-up-tables (LUTs) that associate various source formats each to a set of offset values and/or scaling factors.

In this manner, the techniques described in the present disclosure may improve operational flexibility of a display pipeline, for example, by implementing a format convert block that converts image data indicated using various source formats into the internal format before subsequent processing. In fact, to further improve operational flexibility, source format compatibility of the display pipeline may be expanded merely by adjusting implementation of the format convert block, for example, by adding a corresponding format conversion look-up-table. Moreover, the techniques described in the present disclosure may facilitate reducing implementation associated cost of an electronic device that includes the display pipeline, for example, by enabling image data received using different source formats to be processed using the same image data processing blocks (e.g., circuitry).

BRIEF DESCRIPTION OF THE DRAWINGS

Various aspects of this disclosure may be better understood upon reading the following detailed description and upon reference to the drawings in which.

DETAILED DESCRIPTION

Figure 1:
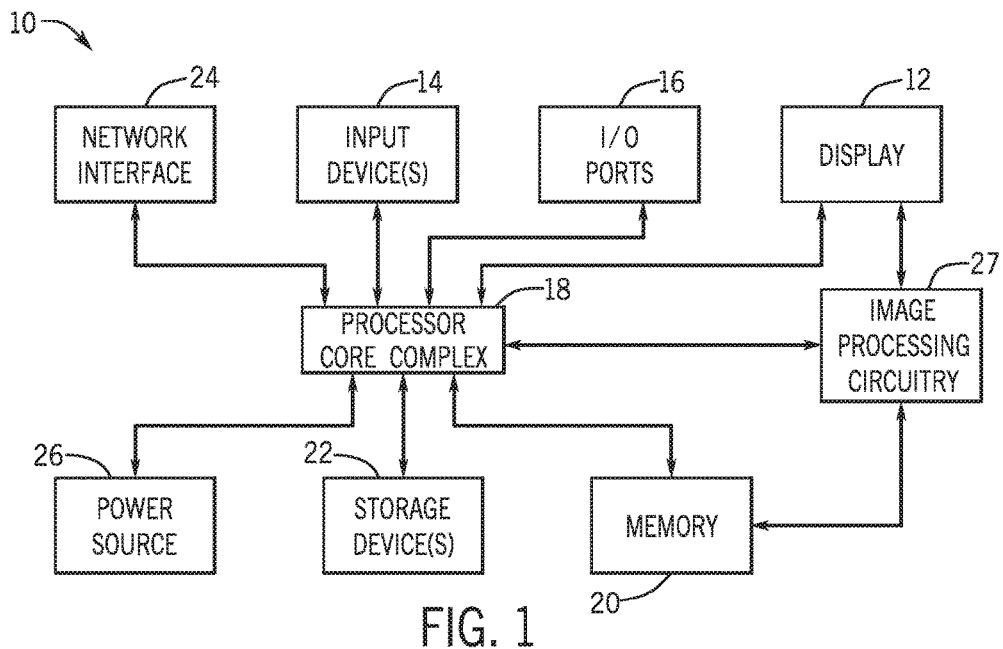
FIG. 1 is a block diagram of an electronic device including an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to electronic displays, which may be used to present visual representations of information as one or more images (e.g., image frames and/or pictures). To display an image, an electronic display may control light emission from its display pixels based at least in part on image data that indicates target characteristics of the image. The target characteristics may be indicated using various image data formats. For example, target luminance (e.g., brightness) at a portion (e.g., image pixel) of the image may indicated using an alpha-red-green-blue (αRGB) format, which includes an alpha component, a red component, a green component, and a blue component. Additionally or alternatively, target luminance at the portion of the image may be indicated using a luma-chroma-chroma (YCbCr) format, which includes a luma component, a blue-chroma component, and a red-chroma component.

Even when they include the same components, different image data formats may indicate image data components using different representations. For example, using a first (e.g., 8-8-8-8) αRGB format, the alpha component and the color (e.g., red, green, and blue) components may each be indicated using an 8-bit fixed point representation. On the other hand, using a second (e.g., FP16) αRGB format, the alpha component and the color components may each be indicated using a signed 16-bit floating point representation.

Generally, an image data source may generate image data in a source format. However, in some instances, image data sources may generate source image data using different source formats. For example, a first image data source may generate image data using the first αRGB format while a second image data source may generate image data using the second αRGB format. Additionally or alternatively, an image data source may generate the first image data using the first αRGB format and, subsequently, generate second image data using the second αRGB format.

To facilitate improving perceived image quality, image data may be processed, for example, by a display pipeline before being using to display a corresponding image on an electronic display. However, compatibility of a display pipeline with an image data format may be dependent on implementation of the display pipeline—particularly when implemented using hardware circuitry, such as logic gates and/or the like. In other words, in some instances, implementation of a display pipeline may result in the display pipeline being compatible with one image data format, but not another image data format.

To improve operational flexibility, in some instances, a display pipeline may be implemented to be compatible with multiple different source formats. However, since processing of image data indicated using different formats may vary, expanding format compatibility of a display pipeline may affect implementation associated cost, such as component count in the display pipeline, physical footprint of the display pipeline, and/or manufacturing steps used to implement the display pipeline. For example, due at least in part to the differing number of bits used to indicate an image data component, a display pipeline may be implemented with a first pipeline path for processing image data indicated using the first αRGB format and a second pipeline path for processing image data indicated using the second αRGB format.

Accordingly, the present disclosure provides techniques to improve operational flexibility of a display pipeline with reduced implementation associated cost, for example, by enabling the display pipeline to process multiple different source formats using the same pipeline path. To facilitate improving operational flexibility, in some embodiments, the display pipeline may include a format convert blocks that converts image data from any one of multiple source formats into an internal format before subsequent processing by the display pipeline. By converting into an internal format, subsequent portions of the display pipeline may process image data received with different source formats in a similar manner.

For example, the format convert block may convert both first image data from the first αRGB format and second image data from the second αRGB format into the internal format, thereby generating first internal image data and second internal image data respectively. Since both are converted to the internal format, subsequent portions of a display pipeline may process the first internal image data and the second internal image data using the same circuitry, for example, implemented in a single pipeline path. Thus, to facilitate reducing implementation associated cost, the format convert block may convert each image data component not expected to be directly compatible with subsequent portions of the display pipeline into the internal format, for example, due to value range of an image data component in the source format differing from a value range processing circuitry expects be received.

In some embodiments, the format convert block may convert an image data component from a first format to a second format by mapping a first value range associated with the first format into a second value range associated with the second format, for example, by scaling and/or offsetting the image data component. For example, when indicated using the first (e.g., 8-8-8-8) αRGB format, values of each source image data component may fall within a source range spanning from a source lower limit of zero to a source upper limit of $2^8-1$ (e.g., 255). To facilitate indicating wide color gamut (e.g., outside sRGB color gamut) content, in some embodiments, a source range for an image data component may be selected from an extended source range. For example, when indicated using the second (e.g., FP16) αRGB format, values of each source image data component may fall within an extended source range spanning from an extended source lower limit of $-(2-2^{-10}) \times 2^{15}$ (e.g., $-65504$) to an extended source upper limit of $(2-2^{-10}) \times 2^{15}$ (e.g., 65504).

To indicate a standard (e.g., sRGB) color gamut portion, a source range for an image data component may be selected from a corresponding extended source range. For example, when indicated using the second (e.g., FP16) αRGB format, values of each source image data component may fall within a source range spanning from a source lower limit of zero to a source upper limit of one (e.g., 1.0). In this manner, a source image data component may indicate wide color gamut content using portions of the extended source range outside the source range.

Additionally, when the internal format uses an unsigned 10-bit fixed point representation to indicate an alpha component, values of alpha component internal image data may fall may within an internal alpha range spanning from an internal alpha lower limit of zero to an internal alpha upper limit of $2^{10}-1$ (e.g., 1023). To facilitate displaying a wide color gamut content, in some embodiments, an internal range for color component image data may be selected from a corresponding extended internal range. For example, when indicated using a signed 30-bit fixed point representation, values of each color component internal image data may fall within an extended internal range spanning from an extended internal lower limit of $-(2^{29}-1)$ to an extended internal upper limit of $(2^{29}-1)$.

To indicate a standard (e.g., sRGB) color gamut portion, an internal range for color component image data may be selected from a corresponding extended source range. For example, values of color component image data may fall within an internal range spanning from a source lower limit of zero to a source upper limit of $2^{24}$. In this manner, the internal format may provide sufficient headroom to propagate wide color gamut content through the display pipeline. At least in some instances, this may facilitate improving perceived image quality when a corresponding image is displayed on an electric display, for example, by enabling a display pipeline to dynamically (e.g., adaptively) adjust amount of wide color gamut content displayed based at least in part on electronic display dynamic range expected to be available and/or detected ambient light conditions.

As described above, to convert an image data component from a source format to the internal format, the convert block may scale and/or offset the image data component, for example, by applying a corresponding offset value and/or a corresponding scaling factor. In some embodiments, the offset value and/or the scaling factor to be applied to an image data component may be determined based at least in part on difference between a corresponding source range and a corresponding internal range. For example, the offset value to be may be determined based at least in part on difference between a source lower limit of a corresponding source range and an internal lower limit of a corresponding internal range. In other words, the offset value may be determined to account for biasing differences applied when interpreting the source format and the internal format and, thus, at least in some instances may be zero. By applying the offset value, the image data component may be adjusted such that the source lower limit matches the internal lower limit.

Additionally, the scaling factor to be applied to an image data component may be determined to account for difference between span of the corresponding source range and span of the corresponding internal range and, thus, at least in some instances may be one. For example, when the source lower limit matches the internal lower limit (e.g., after applying the offset value), the scaling factor may be determined based at least in part on ratio of an internal upper limit of the corresponding internal range relative to a source upper limit of the corresponding source range. By applying the scaling factor (e.g., after the offset value), the image data component may be adjusted such that the source upper limit matches the internal upper limit.

In this manner, a format convert block may convert image data components from a source format into the internal format by applying a corresponding offset value and/or a corresponding scaling factor. In some embodiments, the format convert block may algorithmically determine offset values and/or scaling factors, for example, based at least in part on characteristics (e.g., included image data components, implicit biasing, an extended source range, a source range, and/or bit allocation) of a source format and target characteristics (e.g., supported image data components, an extended internal range, an internal range and/or bit allocation) of the internal format. Additionally or alternatively, the offset values and/or scaling factors may be predetermined, for example, by a design device and stored via one or more conversion look-up-tables (LUTs) that associate various source formats each to a set of offset values and/or scaling factors.

Furthermore, in some embodiments, offset values and/or scaling factors associated with different image data components in a source format may differ. For example, an alpha scaling factor may differ from a color component scaling factor due to the internal format indicating an alpha component using an unsigned 10-bit fixed point representation and each color format using a signed 30-bit fixed point representation. Additionally or alternatively, a chroma scaling factor may be biased slightly from a luma scaling factor, for example, to reduce likelihood that applying the chroma scaling factor affects perception of neutrals when a corresponding image is displayed.

In this manner, the techniques described in the present disclosure may improve operational flexibility of a display pipeline, for example, by implementing a format convert block that converts image data indicated using various source formats into the internal format before subsequent processing. In fact, to further improve operational flexibility, source format compatibility of the display pipeline may be expanded merely by adjusting implementation of the format convert block, for example, by adding a corresponding format conversion look-up-table. Moreover, the techniques described in the present disclosure may facilitate reducing implementation associated cost of an electronic device that includes the display pipeline, for example, by enabling image data received using different source formats to be processed using the same image data processing blocks (e.g., circuitry).

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

In the depicted embodiment, the electronic device 10 includes the electronic display 12, input devices 14, input/output (I/O) ports 16, a processor core complex 18 having one or more processors or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. In some embodiments, the local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

In some embodiments, the processor core complex 18 may execute instruction stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

As depicted, the processor core complex 18 is also operably coupled with the network interface 24. Using the network interface 24, the electronic device 10 may be communicatively coupled to a network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

Additionally, as depicted, the processor core complex 18 is operably coupled to the power source 26. In some embodiments, the power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the I/O ports 16 and the input devices 14. In some embodiments, the I/O ports 16 may enable the electronic device 10 to interface with various other electronic devices. Additionally, in some embodiments, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control luminance of one color component (e.g., red, blue, or green).

As described above, the electronic display 12 may display an image by controlling luminance of the sub-pixels based at least in part on corresponding image data (e.g., image pixel image data and/or display pixel image data). In some embodiments, the image data may be received from another electronic device, for example, via the network interface 24 and/or the I/O ports 16. Additionally or alternatively, the image data may be generated by the processor core complex 18 and/or the image processing circuitry 27.

Figure 2:
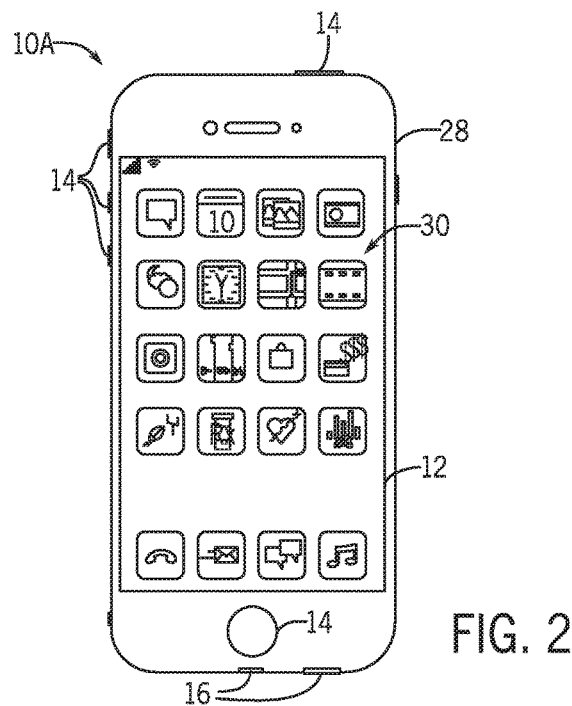
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
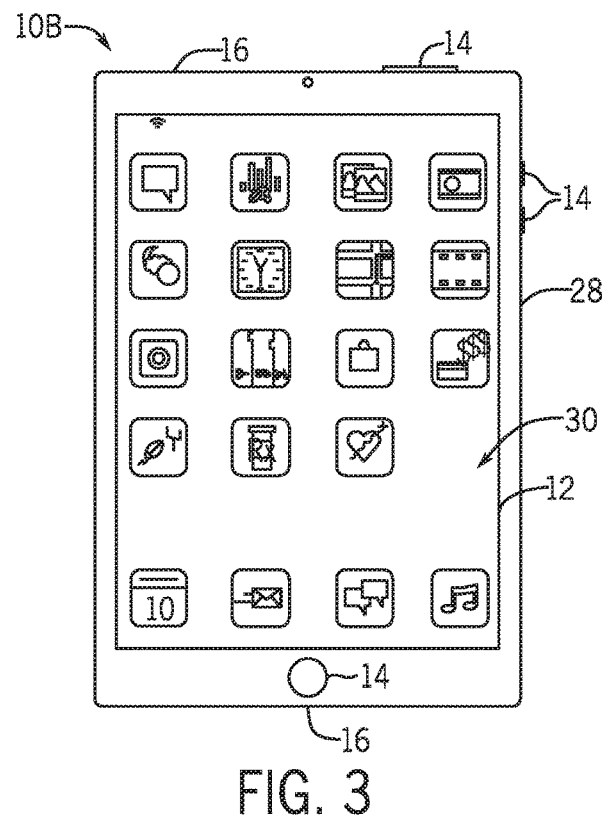
FIG. 3 is another example of the electronic device of FIG. 1, in accordance with an embodiment.
Figure 4:
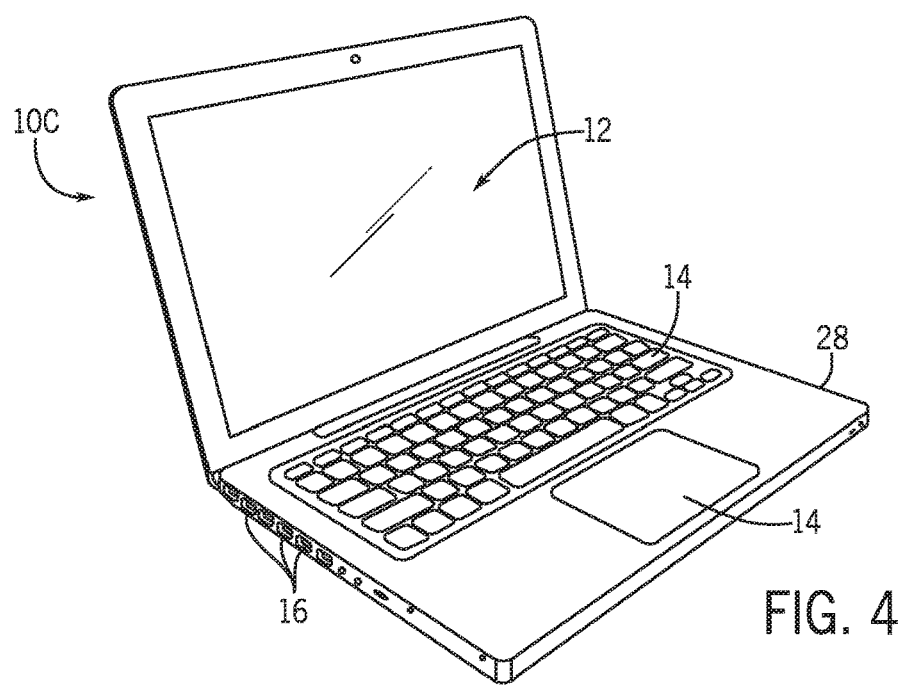
FIG. 4 is another example of the electronic device of FIG. 1, in accordance with an embodiment.
Figure 5:
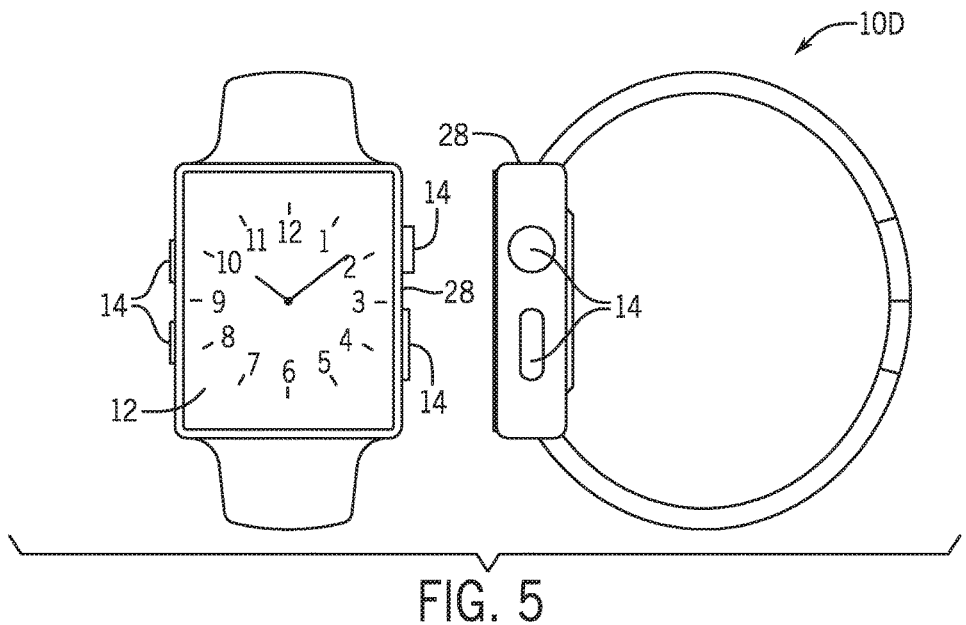
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic display 12 may display images based at least in part on image data received, for example, from the processor core complex 18 and/or the image processing circuitry 27. Additionally, as described above, the image data may be processed before being used to display a corresponding image on the electronic display 12. In some embodiments, a display pipeline may process the image data, for example, to blend color components based on a corresponding alpha component and/or to map from a source color gamut (e.g., space) into a display panel color gamut.

Figure 6:
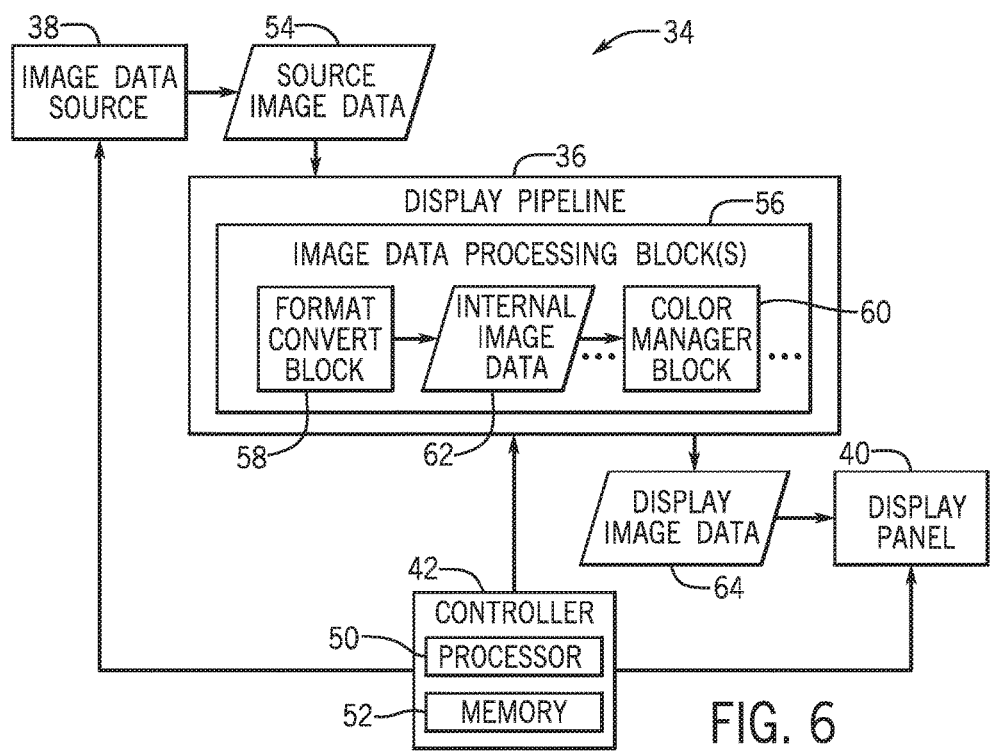
FIG. 6 is a block diagram of a portion of the electronic device of FIG. 1 including a display pipeline, in accordance with an embodiment.

To help illustrate, a portion 34 of the electronic device 10 including a display pipeline 36 is shown in FIG. 6. In some embodiments, the display pipeline 36 may be implemented by circuitry in the electronic device 10, circuitry in the electronic display 12, or a combination thereof. For example, the display pipeline 36 may be included in the processor core complex 18, the image processing circuitry 27, a timing controller (TCON) in the electronic display 12, or any combination thereof.

As depicted, the portion 34 of the electronic device 10 also includes an image data source 38, a display panel 40, and a controller 42. In some embodiments, the controller 42 may control operation of the display pipeline 36, the image data source 38, and/or the display panel 40. To facilitate controlling operation, the controller 42 may include a controller processor 50 and controller memory 52. In some embodiments, the controller processor 50 may execute instructions stored in the controller memory 52. Thus, in some embodiments, the controller processor 50 may be included in the processor core complex 18, the image processing circuitry 27, a timing controller in the electronic display 12, a separate processing module, or any combination thereof. Additionally, in some embodiments, the controller memory 52 may be included in the local memory 20, the main memory storage device 22, a separate tangible, non-transitory, computer readable medium, or any combination thereof.

In the depicted embodiment, the display pipeline 36 is communicatively coupled to the image data source 38. In this manner, the display pipeline 36 may receive source image data 54 corresponding with an image to be displayed on the electronic display 12 from the image data source 38. As described above, the source image data 54 may indicate target characteristics of a portion (e.g., image pixel) of the image using a source format, such as an 8-bit fixed point αRGB format, a 10-bit fixed point αRGB format, a signed 16-bit floating point αRGB format, an 8-bit fixed point YCbCr format, a 10-bit fixed point YCbCr format, a 12-bit fixed point YCbCr format, and/or the like. In some embodiments, the image data source 38 may be included in the processor core complex 18, the image processing circuitry 27, or a combination thereof.

As described above, the display pipeline 36 may operate to process source image data 54 received from the image data source 38. To simplify discussion, the functions (e.g., operations) performed by the display pipeline 36 are divided between various image data processing blocks 56 (e.g., circuitry or modules). For example, in the depicted embodiment, the image data processing blocks 56 include a format convert block 58 and a color manager block 60. In some embodiments, the image data processing blocks 56 may additionally or alternatively include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

As will be described in more detail below, to facilitate subsequent processing, the format convert block 58 may generate internal image data 62 by converting the source image data 54 from a source format to an internal format. In this manner, downstream image data processing block 56 and/or communication busses may be implemented to be directly compatible with the internal format instead of multiple different source formats, which at least in some instances may facilitate reducing implementation associated cost and/or improving operational flexibility. For example, the color manager block 60 may generate display image data 64 by mapping internal image data 62 into a color gamut provided by the display panel 40 and/or tone mapping internal image data 62 based at least in part on available dynamic range of the display panel 40.

After processing, the display pipeline 36 may output display image data 64 to the display panel 40. Based at least in part on the display image data 64, the display panel 40 may apply analog electrical signals to the display pixels of the electronic display 12 to display one or more corresponding images. In this manner, the display pipeline 36 may operate to facilitate providing visual representations of information on the electronic display 12.

Figure 7:
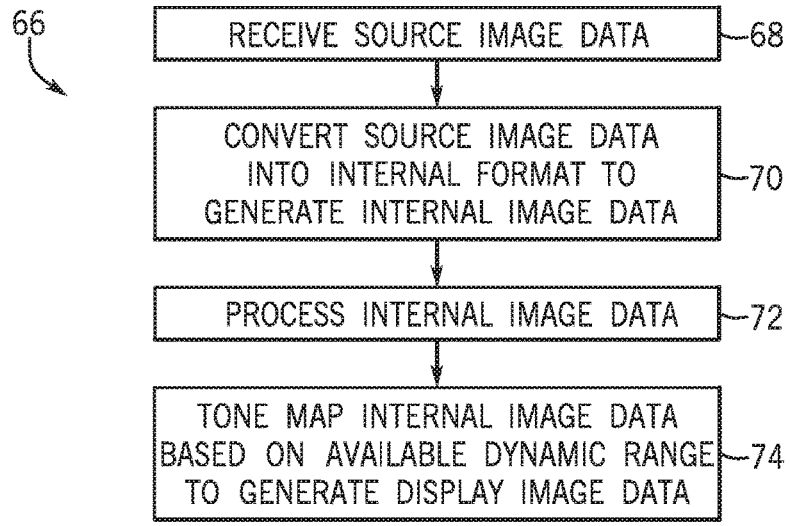
FIG. 7 is a flow diagram of a process for operating the display pipeline of FIG. 6, in accordance with an embodiment.

To help illustrate, an example of a process 66 for operating the display pipeline 36 is described in FIG. 7. Generally, the process 66 includes receiving source image data (process block 68), converting the source image data into an internal format to generate internal image data (process block 70), processing the internal image data (process block 72), and tone mapping the internal image data based on available dynamic range to generate display image data (process block 74). In some embodiments, the process 66 may be implemented based on circuit connections formed in the display pipeline 36. Additionally or alternatively, in some embodiments, the process 66 may be implemented by executing instructions stored in a tangible non-transitory computer-readable medium, such as the controller memory 52, using processing circuitry, such as the controller processor 50.

As described above, a display pipeline 36 may receive source image data 54 output from one or more image data sources 38 (process block 68). Additionally, as described above, source image data 54 may indicate target characteristics of a corresponding image using a source format, such as an 8-bit fixed point αRGB format, a 10-bit fixed point αRGB format, a signed 16-bit floating point αRGB format, an 8-bit fixed point YCbCr format, a 10-bit fixed point YCbCr format, a 12-bit fixed point YCbCr format, and/or the like. Furthermore, as described above, different source image data 54 may be indicated using different source formats.

Thus, to facilitate subsequent processing (e.g., by a downstream image data processing block 56), a format convert block 58 in the display pipeline 36 may generate internal image data by converting source image data 54 into an internal format (process block 70). To help illustrate, an example of a process 76 for operating the format convert block 58 is described in FIG. 8. Generally, the process 76 includes determining a source format (process block 78), offsetting and/or scaling based on the source format (process block 80), determining whether the source format includes an alpha component (decision block 82), clipping alpha component image data within an internal range when the source format includes the alpha component (process block 84), and clipping color component image data within an extended internal range (process block 86). In some embodiments, the process 76 may be implemented based on circuit connections formed in the display pipeline 36. Additionally or alternatively, in some embodiments, the process 76 may be implemented by executing instructions stored in a tangible non-transitory computer-readable medium, such as the controller memory 52, using processing circuitry, such as the controller processor 50.

The format convert block 58 may determine a source format used to indicate source image data 54 received by the display pipeline 36 (process block 78). In some embodiments, the format convert block 58 may receive an indication of the source format, for example, from the image data source 38 via one or more communication signals. Additionally or alternatively, the format convert block 58 may determine the source format based on characteristics of the source image data 54, for example, by parsing the source image data 54 to determine included image data components and/or bit allocation (e.g., number of bits per image data component, bit position of exponent bits, bit position of fraction bits, and/or bit position of sign bits).

Based at least in part on the source format, the format convert block 58 may offset and/or scale the source image data 54 (process block 80). As described above, the format convert block 58 may offset an image data component by applying a corresponding offset value and scale the image data component by applying a corresponding scaling factor. Additionally, in some embodiments, offset values and/or scaling factors associated with various source formats may be predetermined and stored, for example, via one or more format conversion look-up-tables (LUTs).

Figures 9, 10:
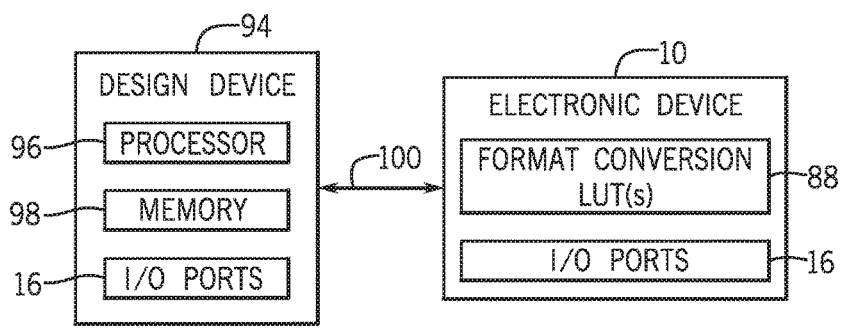
FIG. 9 is a diagrammatic representation of a format conversion look-up-table (LUT), in accordance with an embodiment.
FIG. 10 is block diagram of a design device that determines a format conversion look-up-table stored in the electronic device of FIG. 1, in accordance with an embodiment.

To help illustrate, an example of a format conversion look-up-table 88 is shown in FIG. 9. In the depicted embodiment, the format conversion look-up-table 88 indicates scaling factors and/or offset values associated with an 8-bit fixed point αRGB format in a first column 90A, a 10-bit (e.g., 10-10-10-10) fixed point αRGB format in a second column 90B, an 8-bit fixed point YCbCr format in a third column 90C, and a 10-bit fixed point YCbCr format in a fourth column 90D. In particular, alpha (α) scaling factors are indicated in a first row 92A, red-green-blue (RGB) offset values are indicated in a second row 92B, red-green-blue (RGB) scaling factors are indicated in a third row 92C, luma (Y) scaling factors are indicated in a fourth row 92D, and chroma (C) scaling factors are indicated in a fifth row 94E.

It should be appreciated that the depicted example is merely intended to be illustrative and not limiting. In other words, in other embodiments, a format conversion look-up-table 88 may include other source formats, other scaling factors, and/or other offset values. For example, a format conversion look-up-table 88 may additionally associate a scaling factors and/or offset values to a signed 16-bit floating point αRGB (e.g., FP16) format. Additionally, a format conversion look-up-table 88 may also associate one or more source formats to an alpha offset value, a luma offset value, and/or a chroma offset value. In any case, as described above, one or more format conversion look-up-tables 88 may be predetermined and stored in the electronic device 10, for example, via a design device.

To help illustrate, an example of a design device 94 communicatively coupled an electronic device 10 is shown in FIG. 10. As described above, the design device 94 may determine and store one or more format conversion look-up-tables 88 in the electronic device 10. To facilitate determining a format conversion look-up-table 88, the design device 94 may include a design processor 96 and design memory 98. In some embodiments, the design processor 96 may execute instructions stored in the design memory 98. Thus, in some embodiments, the design processor 96 may be included in the processor core complex 18, the image processing circuitry 27, a timing controller in the electronic display 12, the controller processor 50, a separate processing module, or any combination thereof. Additionally, in some embodiments, the design memory 98 may be included in the local memory 20, the main memory storage device 22, the controller memory 52, a separate tangible, non-transitory, computer readable medium, or any combination thereof.

Furthermore, to facilitate storing a format conversion look-up-table 88, the design device 94 and the electronic device 10 may be communicatively coupled, for example, via input/output (I/O) ports 16 and/or a communication network 100. In some embodiments, a format conversion look-up-table 88 may be stored in a manner accessible by a display pipeline 36 implemented in the electronic device 10. For example, a format conversion look-up-table 88 may be stored in internal memory of the display pipeline 36, thereby enabling the display pipeline 36 to directly access the format conversion look-up-table 88.

After stored in the electronic device 10, the display pipeline 36 may access the format conversion look-up-table 88 to determine scaling factors and/or offset values associated with a source format. For example, with regard to FIG. 9, a format convert block 58 in the display pipeline 36 may determine that, when the source format is an 8-bit fixed point αRGB format, an alpha scaling factor of $(2^{10}-1)/(2^8-1)$ should be applied to an alpha component of source image data 54, a color component offset value of zero should be applied to each color (e.g., red, green, or blue) component of source image data 54, and a color component scaling factor of $2^{24}/(2^8-1)$ should be applied to each color component of source image data 54. In this manner, based at least in part on a corresponding source format, a format convert block 58 may use a predetermined format conversion look-up-table 88 to determine an offset value and/or a scaling factor associated with each image data component including in source image data 54.

Figure 11:
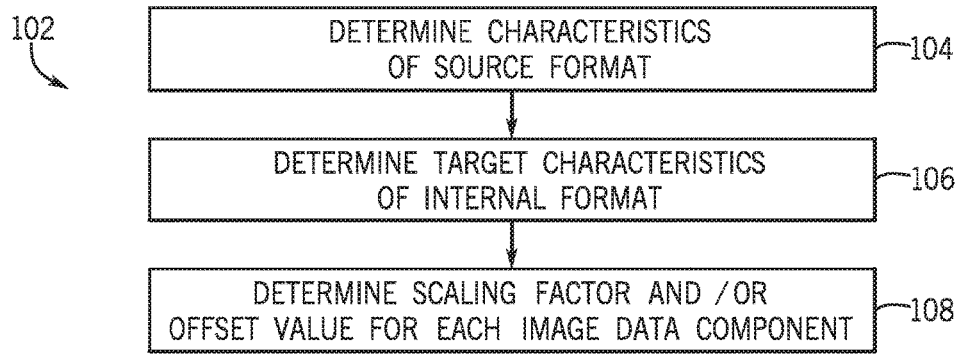
FIG. 11 is a flow diagram of a process for operating the design device of FIG. 10, in accordance with an embodiment.

An example of a process 102 for operating a design device 94 is described in FIG. 11. Generally, the process 102 includes determining characteristics of a source format (process block 104), determining target characteristics of an internal format (process block 106), and determining a scaling factor and/or an offset value for each image data component (process block 108). In some embodiments, the process 102 may be implemented by executing instructions stored in a tangible non-transitory computer-readable medium, such as the design memory 98, using processing circuitry, such as the design processor 96.

The design device 94 may determine characteristics of each source format with which a display pipeline 36 is intended to be compatible (process block 104). In some embodiments, characteristics of a source format may be predetermined and input to the design device 94. Additionally or alternatively, the design device 94 determine characteristics of a source format by analyzing corresponding source image data 54.

Figure 12:
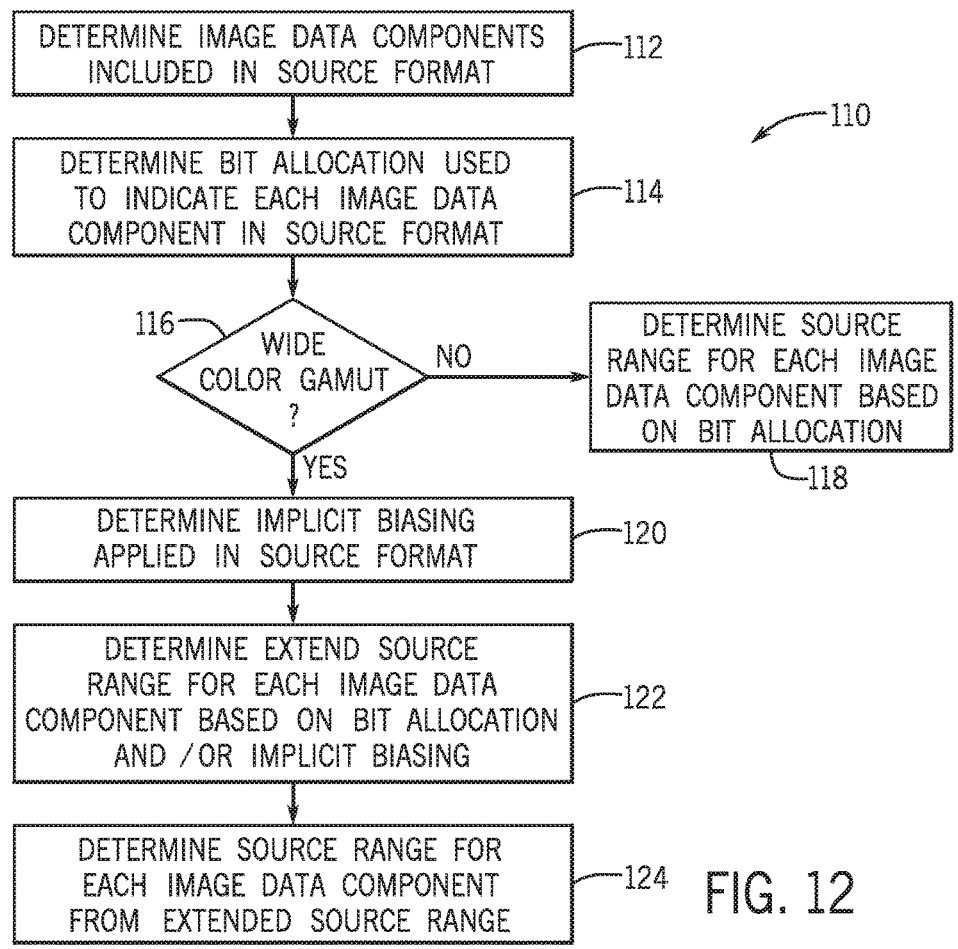
FIG. 12 is a flow diagram of a process for determining target characteristics of an internal format, in accordance with an embodiment.

To help illustrate, an example of a process 110 for determining characteristics of a source format is described in FIG. 12. Generally, the process 110 includes determining image data components included in a source format (process block 112), determining bit allocation used to indicate each image data component in the source format (process block 114), determining whether the source format indicates wide color gamut content (decision block 116), and determining a source range for each image data component based on the bit allocation when the source format does not indicate wide color gamut content (process block 118). Additionally, when the source format does indicate wide color gamut content, the process 110 includes determining implicit biasing applied in the source format (process block 120), determining an extended source range for each image data component based on bit allocation and/or implicit biasing (process block 122), and determining a source range for each image data component from the extended source range (process block 124). In some embodiments, the process 110 may be implemented by executing instructions stored in a tangible non-transitory computer-readable medium, such as the design memory 98, using processing circuitry, such as the design processor 96.

To facilitate providing compatibility with a source format, the design device 94 may determine image data components included in the source format (process block 112). For example, when a YCbCr format, the design device 94 may determine that the source format includes luma components, blue-chroma components, and red-chroma components. Additionally, when an αRGB format, the design device 94 may determine that the source format includes red components, green components, blue components, and alpha components, which in some instance may be zero.

Additionally, the design device 94 may determine bit allocation used to indicate each image data component in the source format (process block 114). In some embodiments, the design device 94 may determine whether bits of source image data 54 are allocated as exponent bits and fraction bits, which is indicative of whether the source format uses a floating point representation or a fixed point representation. When using a fixed point representation, the design device 94 may determine number of bits allocated to indicate each image data component in the source format. For example, when a first 10-bit (e.g., 10-10-10-10) fixed point αRGB format, the design device 94 may determine that the source format allocates ten bits per alpha component, ten bits per red component, ten bits per green component, and ten bits per blue component. Additionally, when a second 10-bit (e.g., 2-10-10-10) fixed point αRGB format, the design device 94 may determine that the source format allocates two bits per alpha component, ten bits per red component, ten bits per green component, and ten bits per blue component.

Figure 13:
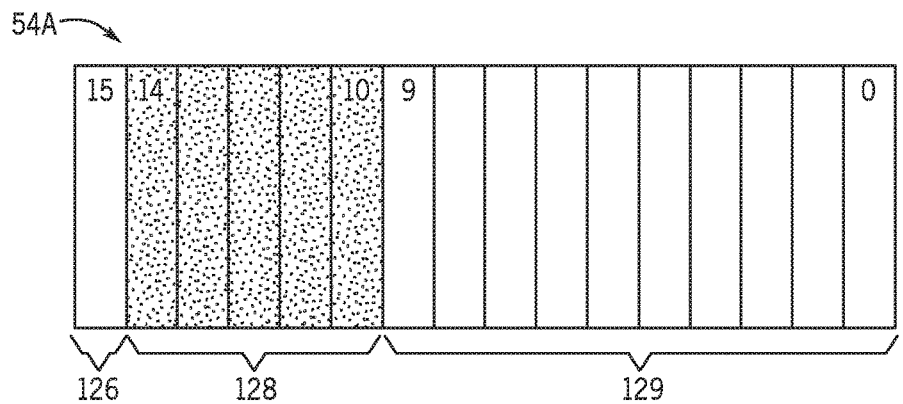
FIG. 13 is a diagrammatic representation of an image data component in an example internal format, in accordance with an embodiment.

On the other hand, when using a floating point representation, the design device 94 may determine number of bits allocated as exponent bits, number of bits allocated as fraction bits, and/or whether a bit is allocated as a sign bit, for example, by analyzing corresponding source image data 54. To help illustrate, an example of signed 16-bit floating point αRGB (e.g., FP16) source image data 54A corresponding with an image data component is shown in FIG. 13. By analyzing the source image data 54A, the design device 94 may determine that bit allocation in a corresponding source format includes a sign bit 126, five exponent bits 128, and ten fraction bits 129.

Returning to the process 110 of FIG. 12, the design device 94 may determine whether the source format is intended to support wide color gamut content (decision block 116). In some embodiments, the design device 94 may determine whether wide color gamut content is intended to be supported based at least in part on what image data components are included in the source format. For example, when including a luma component and/or a chroma component, the design device 94 may determine that the source format is not intended to indicate wide gamut content.

Additionally or alternatively, the design device 94 may determine whether wide color gamut content is intended to be supported based at least in part on bit allocation used by the source format. In some embodiments, when the source format uses a fixed point representation, the design device 94 may determine whether the source format is intended to indicate wide color gamut content based at least in part on number of bits allocated to indicate each color component. For example, the design device 94 may determine that wide color gamut content is not intended to be supported when less than ten bits are allocated to indicate each color component in the source format and that wide color gamut content is intended to be supported when ten bits are allocated to indicate each color component in the source format. Additionally or alternatively, the design device 94 may determine that wide color gamut content is intended to be supported when the source format uses a floating point representation to indicate the color components.

When the source format is not intended to support wide color gamut content, the design device 94 may determine a source range for each image data component based on corresponding bit allocation (process block 118). In some embodiments, when N-bits are allocated to indicate an image data component, the design device 94 may determine that a corresponding source range spans from a source lower limit of zero to a source upper limit of $2^N-1$. For example, when eight bits are allocated to indicate an image data component, the design device 94 may determine that the corresponding source range spans from a source lower limit of zero to a source upper limit of $2^8-1$. Additionally, when ten bits are allocated to indicate an image data component, the design device 94 may determine that the corresponding source range spans from a source lower limit of zero to a source upper limit of $2^{10}-1$.

On the other hand, when the source format is intended to support wide color gamut content, the design device 94 may determine value of any implicit biasing to be applied when interpreting corresponding source image data 62 (process block 120). For example, when a 10-bit fixed point αRGB (e.g., CIF10) format, the design device 94 may determine that each color component is implicitly biased a value of −384 to facilitate indicating wide color gamut content. Additionally, when a signed 16-bit floating point αRGB (e.g., FP16) format, the design device 94 may determine that exponent bits of each image data component are implicitly biased a value of −15.

Based at least in part on bit allocation and/or implicit biasing applied in the source format, the design device 94 may determine an extended source range for each image data component (process block 122). In some embodiments, when K fixed point bits are allocated to indicate an image data component, the design device 94 may determine that a corresponding extended source range spans from an extended source lower limit of zero to an extended source upper limit of $2^K-1$. For example, when ten fixed point bits are allocated to indicate an image data color component, the design device 94 may determine that the corresponding extended source range spans from an extended source lower limit of zero to an extended source upper limit of $2^{10}-1$.

Additionally or alternatively, when an image data component is indicated using a sign bit followed by L exponent bits, which is implicitly biased by a value of M, and N fraction bits, the design device 94 may determine that a corresponding extended source range spans from an extended source lower limit of $-(2-2^N) \times 2^{L-M}$ to an extended source upper limit of $(2-2^N) \times 2^{L-M}$. For example, when an image data component is indicated using a signed 16-bit floating point αRGB (e.g., FP16) format, the design device 94 may determine that a corresponding extended source range spans from an extended source lower limit of $-(2-2^{-10}) \times 2^{15}$ (e.g., −65504) to an extended source upper limit of $(2-2^{-10}) \times 2^{15}$ (e.g., 65504).

From a corresponding extended source range, the design device 94 may determine a source range for each image data component included in the source format (process block 124). As described above, the design device 94 may determine a source range based at least in part on portion of a corresponding extended source range intended to indicate standard color gamut (e.g., sRGB) content. In some embodiments, when an image data component is indicated using a K fixed point bits implicitly biased by a value of M, the design device 94 may determine that a corresponding pre-biased source range spans from a source lower limit of −M to a source upper limit of $(2^K-1)-M$. For example, when an image data component is indicated using a 10-bit fixed point (e.g., CIF10) format implicitly biased by a value of −384, the design device 94 may determine that the corresponding pre-biased source range spans from a source lower limit of 384 to a source upper limit of $(2^{-10}-1)+384$ (e.g., 895). In other words, accounting for the implicit biasing, the corresponding source range spans from a source lower limit of zero to a source upper limit of 511.

Additionally or alternatively, when an image data component is indicated using a floating point representation, the design device 94 may determine that a corresponding source range spans from a source lower limit of zero to a source upper limit of one (e.g., 1.0). In this manner, characteristics of the source format (e.g., included image data components, bit allocation, implicit biasing, an extended source range, and/or a source range) may be determined. Moreover, in a similar manner, characteristics of each source format with which a display pipeline 36 is intended to be compatible may be determined.

Returning to the process 102 of FIG. 11, the design device 94 may determine target characteristics of an internal format used by the display pipeline 36 (process block 106). In some embodiments, target characteristics of the internal format may be predetermined and input to the design device 94. Additionally or alternatively, the design device 94 determine target characteristics by analyzing internal image data 62 in the internal format and/or implementation of downstream image data processing block 56 in the display pipeline 36.

To help illustrate, an example of a process 130 for determining target characteristics of an internal format is described in FIG. 12. Generally, the process 130 includes determining image data components to be supported by an internal format (process block 132), determining whether the image data components include an alpha component (decision block 134), determining bit allocation for each color component in the internal format (process block 136), determining an extended internal range for each color component based on the bit allocation (process block 138), and determining an internal range for each color component from the external internal range (process block 140). Additionally, when the image data components include an alpha component, the process 130 includes determining number of bits used to indicate the alpha component in the internal format (process block 142) and determining an internal range for the alpha component based on the number of bits (process block 144). In some embodiments, the process 130 may be implemented by executing instructions stored in a tangible non-transitory computer-readable medium, such as the design memory 98, using processing circuitry, such as the design processor 96.

The design device 94 may determine image data components expected to be supported by the internal format (process block 132). To determine image data components expected to be supported, in some embodiments, the design device 94 may analyze functions (e.g., operations) performed by one or more image data processing block 56 in the display pipeline 36. For example, when the color manager block 60 is implemented to convert from a YCbCr color gamut (e.g., space) to a RGB color gamut, the design device 94 may determine that the image data components expected to be support by the internal format include red components, green components, blue components, luma components, red-chroma components, and blue-chroma components.

Additionally or alternatively, the design device 94 may determine the image data components expected to be supported based at least in part on characteristics of source formats with which the display pipeline 36 is intended to be compatible. For example, when the display pipeline 36 is expected to be compatible with a YCbCr source format, the design device 94 may determine that the image data components expected to be support by the internal format include luma components, blue-chroma components, and red-chroma components. Additionally, when the display pipeline 36 is expected to be compatible with an αRGB format, the design device 94 may determine that the image data components expected to be support by the internal format include alpha components, red components, green components, and blue components. To facilitate improving operational flexibility, in other embodiments, the design device 94 may determine that internal format should support all image data components that may be included in image data.

When the image data components expected to be supported include an alpha component, the design device 94 may determine number of bits used to indicate the alpha component in the internal format (process block 132). Additionally, based on number of bits used to indicate the alpha component, the design device 94 may determine an internal alpha range, which encompasses possible values of alpha component internal image data. For example, when the internal format uses an unsigned 10-bit fixed point representation, the design device 94 may determine that alpha component internal image data is indicated using ten bits and, thus, that an alpha component internal range spans from an internal lower limit of zero to an internal upper limit of $2^{10}-1$ (e.g., 1023).

Figure 15:
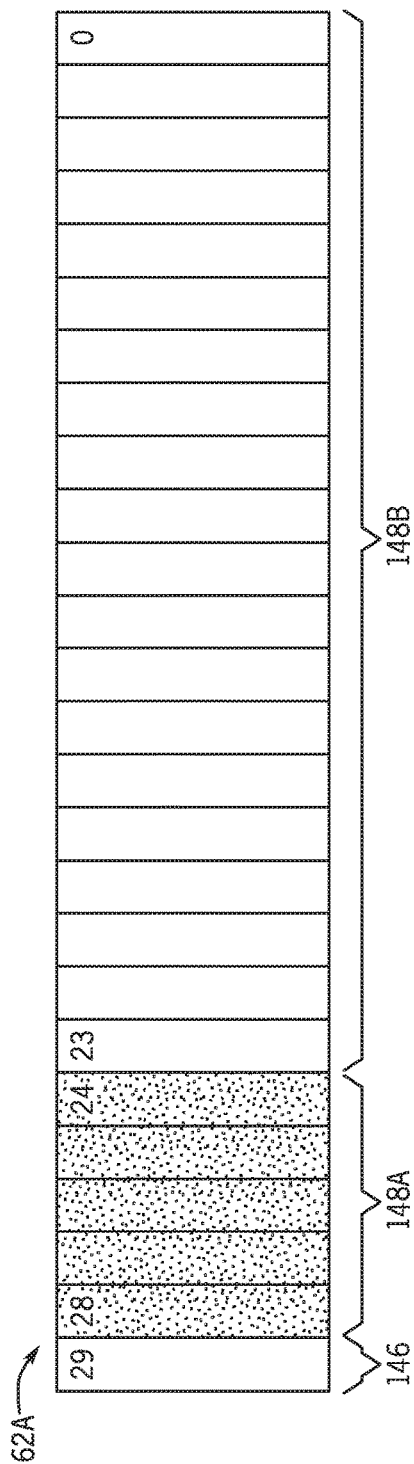
FIG. 15 is a diagrammatic representation of an image data component in an example source format, in accordance with an embodiment.

Additionally, the design device 94 may determine bit allocation used to indicate each color component in the internal format (process block 136) and determine an extended internal range for each color component based at least in part on the bit allocation (process block 138). To help illustrate, an example of signed 30-bit fixed point internal image data 62A corresponding with a color component is shown in FIG. 15. By analyzing the internal image data 62A, the design device 94 may determine that bit allocation in the internal format includes a sign bit 146 and twenty-nine magnitude bits 148. Based on this bit allocation, the design device 94 may determine that a corresponding extended internal color range spans from an extended internal lower limit of $-(2^{29}-1)$ to an extended internal upper limit of $2^{29}-1$.

Figure 14:
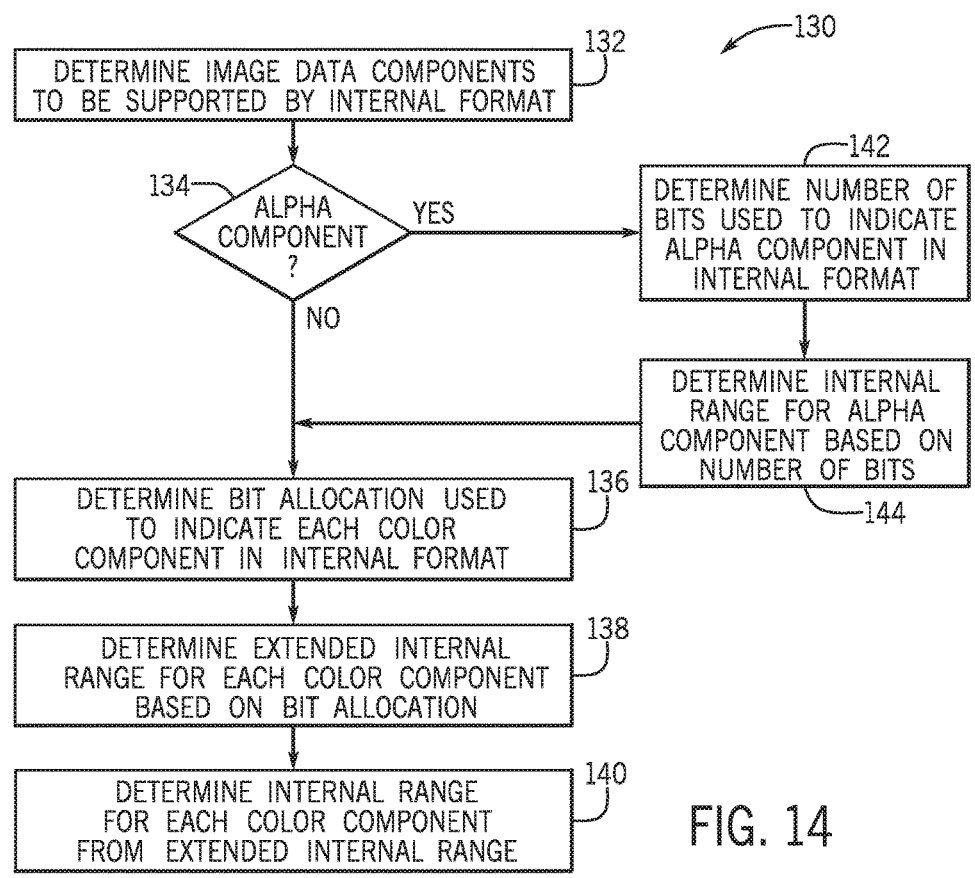
FIG. 14 is a flow diagram of a process for determining characteristics of a source format, in accordance with an embodiment.

Returning to the process 130 of FIG. 14, the design device 94 may determine an internal range for each color component from a corresponding extended internal range (process block 140). In some embodiments, the design device 94 may reserve the internal range for indicating standard color gamut (e.g., sRGB) content, thereby enabling wider color gamut content to be indicated in remaining portions of the extended internal range. To facilitate identifying an internal range from a corresponding extended internal range, in some embodiments, magnitude bits 148 of internal image data 62 may be interpreted as an integer followed by a decimal.

For example, with regard to FIG. 15, a first portion 148A (e.g., [24:28]) may be interpreted as an integer and a second portion 148B (e.g., [0:23]) may be interpreted as a decimal. Based on this interpretation, the design device 94 may determine that an internal color range used to indicate standard color gamut content spans from an internal lower limit of zero to an internal upper limit of $2^{24}$. In other words, the internal image data 62A may indicate wide color gamut content when greater than the internal upper limit (e.g., $(2^{24}, 2^{29}-1])$ or less than the internal lower limit (e.g., $[-(2^{29}-1), 0))$. In this manner, target characteristics of an internal format (e.g., supported image data components, bit allocation, an extended internal range, and/or an internal range) to be implemented in a display pipeline 36 may be determined.

Returning to the process 102 of FIG. 11, the design device 94 may determine scaling factors and/or an offset values associated with image data components supported by the internal format based at least in part on the target characteristics of the internal format and/or characteristics of the source format (process block 108). To help illustrate, an example of a process 152 for determining an offset value and a scaling factor associated with an image data component is described in FIG. 16. Generally, the process 152 includes determining difference between a source range and an internal range (process block 154), determining an offset value based on the difference between the source range and the internal range (process block 156), and determining a scaling factor based on the difference between the source range and the internal range (process block 158). In some embodiments, the process 152 may be implemented by executing instructions stored in a tangible non-transitory computer-readable medium, such as the design memory 98, using processing circuitry, such as the design processor 96.

To facilitate determining an offset value and a scaling factor associated with an image data component, the design device 94 may determine difference between a corresponding source range and a corresponding internal range (process block 154). In some embodiments, the design device 94 may determine difference between an internal lower limit of the internal range and a source lower limit of the source range. Additionally, in some embodiments, the design device 94 may determine difference between an internal upper limit of the internal range and a source upper limit of the source range. Furthermore, in some embodiments, the design device 94 may determine difference between span of the internal range and span of the source range.

Based at least in part on difference between the internal range and the source range, the design device 94 may determine the offset value to be applied to the image data component (process block 156). In some embodiments, an offset value may be applied to adjust the source range such that the source lower limit matches the internal lower limit of the internal range. In other words, when source image data 54 is implicitly biased by a value of M, the design device 94 may determine that a corresponding offset value is M. For example, when an image data component is indicated using a 10-bit fixed point (e.g., CIF10) source format implicitly biased by a value of −384, the design device 94 may determine that the corresponding offset value is −384. Additionally or alternatively, the offset value corresponding with the image data component may be programmably set, for example, based on various factors that may affect perceived image quality when a corresponding image is displayed.

Furthermore, the design device 94 may determine the scaling factor to be applied to the image data component based at least in part on difference between the internal range and the source range (process block 158). In some embodiments, a scaling factor may be applied to adjust the source range such that span of the source range matches span of the internal range. In other words, when the source lower limit matches the internal lower limit (e.g., due to applying the offset value), the design device 94 may determine the scaling factor based at least in part on a ratio of the internal upper limit of the internal range relative to the source upper limit of the source range. For example, with regard to FIG. 9, the scaling factor associated with a color (e.g., red, green, blue, or luma) component is $2^{24}/(2^8-1)$ when the source format indicates the color component using an 8-bit fixed point representation.

To facilitate improving perceived image quality, in some embodiments, the upper limit of the source range may be adjusted before being used to determine a corresponding scaling factor. For example, when a color (e.g., red, green, or blue) component is indicated using a 10-bit fixed point αRGB source format, the upper limit of a corresponding source color range, for the purpose of determining the scaling factor, may be adjusted from a value of 511 to a value of 510. Thus, as depicted in FIG. 9, the scaling factor associated with the color component is $2^{24}/510$. Additionally, when a chroma (e.g., red-chroma or blue-chroma) component is indicated using an 8-bit fixed point YCbCr source format, the upper limit of a corresponding source chroma range, for the purpose of determining the scaling factor, may be adjusted from a value of $2^8-1$ to a value of $2^8$. Thus, as depicted in FIG. 9, the scaling factor associated with the chroma component is $2^{24}/2^8$, whereas the scaling factor associated with the luma component is $2^{24}/(2^8-1)$. In some embodiments, implementing chroma scaling factors in this manner may reduce likelihood of conversion to the internal format affecting perception of neutrals when a corresponding image is displayed.

In a similar manner, the design device 94 may determine a scaling factor and/or an offset value for each image data component supported by the internal format. As described above, when predetermined by the design device, scaling factors and/or offset values associated with various source formats may be stored via one or more format conversion look-up-tables 88, for example, in internal memory of a display pipeline 36. Thus, in some embodiments, a format convert block 58 in the display pipeline 36 may read a format conversion look-up-tables 88 based on source format of received source image data 54 to determine associated offset values and/or scaling factors.

Figure 16:
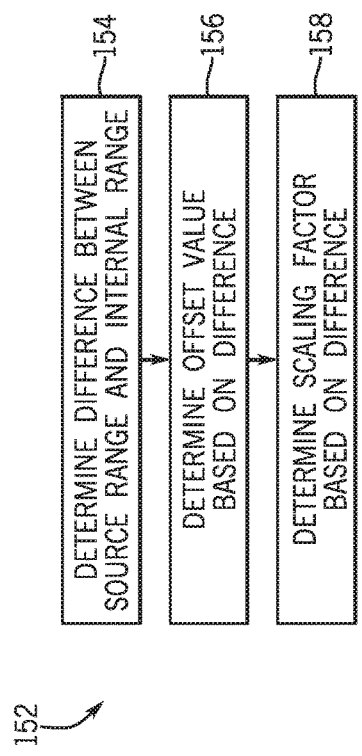
FIG. 16 is a flow diagram of a process for determining an offset value and a scaling factor associated with an image data component, in accordance with an embodiment.

Additionally or alternatively, the format convert block 58 may algorithmically determine offset values and/or scaling factors based on source format of received source image data 54, for example, by implementing any combination of the process 102 described in FIG. 11, the process 110 described in FIG. 12, the process 110 described in FIG. 12, and the process 152 described in FIG. 16. In some embodiments, any combination of those processes may be implemented based on circuit connections formed in the display pipeline 36. Additionally or alternatively, any combination of those processes may be implemented by executing instructions stored in a tangible non-transitory computer-readable medium, such as the controller memory 52, using processing circuitry, such as the controller processor 50.

In any case, the format convert block 58 may offset source image data 54 by applying a corresponding offset value and/or scale the source image data 54 by applying a corresponding scaling factor (e.g., after applying the offset value). To facilitate improving conversion efficiency when a source format uses a floating point representation, in some embodiments, the format convert block 58 may apply offset values and/or scaling factors using a floating point representation. In fact, in some embodiments, the format convert block 58 may convert a floating point source format to an intermediate floating point format and apply an offset value and/or a scaling factor in the intermediate floating point format before conversion to the internal format.

Figure 8:
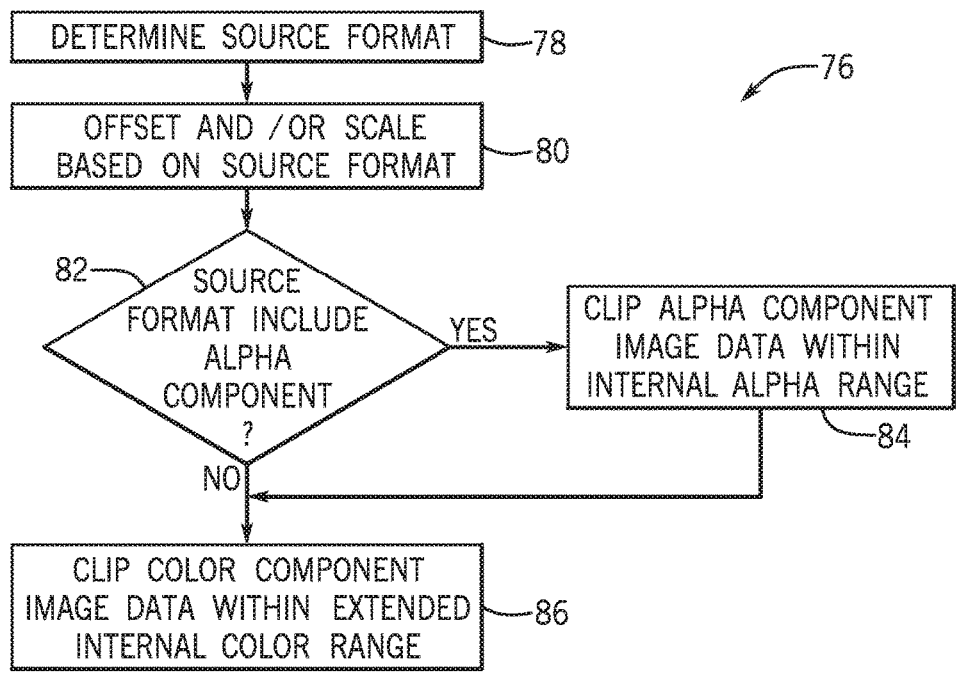
FIG. 8 is a flow diagram of a process for converting image data from a source format to an internal format, in accordance with an embodiment.

Returning to the process 76 of FIG. 8, when the source format includes an alpha component, the convert block 84 may generate alpha component internal image data 62 by clipping a result of offsetting and/or scaling the source image data 54 within an internal alpha range (process block 84). In some embodiments, negative results and/or denormal results may be flushed to an internal lower limit (e.g., zero) of the internal alpha range. Additionally, results greater than an internal upper limit (e.g., 1023) of the internal alpha range may be saturated to the internal upper limit.

Additionally, the convert block 84 may generate color (e.g., red, green, blue, luma, red-chroma, or blue-chroma) component internal image data 62 by clipping a result of offsetting and/or scaling the source image data 54 within a corresponding extended internal color range (process block 86). In some embodiments, underflow results may be flushed to an internal lower limit (e.g., zero) of a corresponding internal color range. Additionally, overflow results greater than an extended internal upper limit (e.g., $2^{29}-1$) of the extended internal color range may be saturated to the extended internal upper limit and results less than an extended internal lower limit (e.g., $-(2^{29}-1)$) of the extended internal color range may be saturated to the extended internal lower limit. In a similar manner, each image data component of source image data 54 may be converted to the internal format to generate corresponding internal image data 62.

Returning to the process 66 of FIG. 7, the display pipeline 36 may process the internal image data 62 via one or more downstream image data processing blocks 56 (process block 72). For example, a first downstream image data processing block 56 may DeGamma the internal image data 62, a second downstream image data processing block 56 may scale the DeGamma-ed internal image data 62, and a third downstream image data processing block 56 may ReGamma the scaled internal image data 62. As described above, the internal format may provide headroom (e.g., within extended internal range and outside internal range) to indicate wide color gamut content, for example, included in the source image data 54 and/or resulting from subsequent processing. Thus, in some embodiments, image data processing blocks 56 between the format convert block 58 and the color manager block 60 may output image data in the internal format, for example, by clipping in a similar manner as the format convert block 58.

To facilitate display of a corresponding image on an electronic display 12, the display pipeline 36 may generate display image data 64 by mapping internal image data 62 based at least in part on characteristics of a display panel 40 in the electronic display, for example, via the color manager block 60 (process block 74). In some embodiments, the color manager block 60 may map the internal image data 62 into display panel color gamut (e.g., space) of the display panel 40. Since internal image data 62 provides headroom to indicate wide color gamut content, propagating the internal format may enable the display panel 40 to utilize more of its color gamut when displaying a corresponding image.

Nevertheless, in some instances, perceptibility of portions of the display panel color gamut may be limited by dynamic range available to the display panel 40. For example, in darker ambient light conditions, available dynamic range may increase, thereby enabling more of the display panel color gamut to be perceived. On the other hand, in brighter ambient light conditions, available dynamic range may decrease, thereby enabling less of the display panel color gamut to be perceived. Accordingly, in some embodiments, the color manager block 60 may tone map the internal image data 62 based at least in part on available dynamic range and/or ambient light conditions to generate display image data 64. Additionally, in some embodiments, one or more downstream image data processing blocks 56 may process the display image data 64 before output, for example, to facilitate further improving perceived image quality when a corresponding image is displayed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a display panel configured to facilitate display of a first image by controlling luminance of a display pixel based at least in part on first display image data; and
a display pipeline coupled to the display panel, wherein the display pipeline comprises:
format convert circuitry configured to:
receive first source image data that indicates target luminance of the display pixel in the first image using a first source format;
determine a first color scaling factor associated with a first color component in the first source image data based at least in part on the first source format; and
generate first internal image data that indicates target luminance of the display pixel in the first image using an internal format based at least in part on application of the first color scaling factor to the first source image data;
image data processing circuitry coupled downstream of the format convert circuitry, wherein the image data processing circuitry is configured to output second internal image data based at least in part on processing of the first internal image data that facilitates improving perceived image quality when the first image is displayed; and
color manager circuitry coupled downstream of the image data processing circuitry, wherein the color manager circuitry is configured to generate the first display image data by tone mapping the second internal image data based at least in part on color gamut of the display panel, available dynamic range of the display panel, ambient light conditions, or any combination thereof.

2. The electronic device of claim 1, wherein the image data processing circuitry is configured to determine the second internal image data by adjusting the first internal image data to offset variations in pixel response of the display pixel.

3. The electronic device of claim 1, wherein:
the display panel is configured to facilitate display of a second image by controlling luminance of the display pixel based at least in part on second display image data;
the format convert circuitry configured to:
receive second source image data that indicates target luminance of the display pixel in the second image using a second source format different from the first source format;
determine a second color scaling factor based at least in part on the second source format; and
generate third internal image data that indicates target luminance of the display pixel in the second image using the internal format based at least in part on application of the second color scaling factor to the second source image data;
the image data processing circuitry is configured to output fourth internal image data based at least in part on processing of the third internal image data that facilitates improving perceived image quality when the second image is displayed; and
the color manager circuitry is configured to generate the second display image data by tone mapping the fourth internal image data based at least in part on the color gamut of the display panel, the available dynamic range of the display panel, the ambient light conditions, or any combination thereof.

4. The electronic device of claim 3, wherein:
the first source format comprises an αRGB image data format that allocates a first number of bits to indicate the first color component in the first source image data;
the second source format comprises a YCbCr image data format allocates a second number of bits to indicate a second color component in the second source image data; and
the second color scaling factor is associated with the second color component in the second source image data, wherein:
the second color scaling factor is equal to the first color scaling factor when the first number of bits allocated to indicate the first color component in the first source image data is eight, the second number of bits allocated to indicate the second color component in the second source image data is eight, and the second color component is a luma component; and
the second color scaling factor is different from the first color scaling factor when the second color component is a chroma component, the first number of bits allocated to indicate the first color component in the first source image data is ten, or the first number of bits allocated to indicate the first color component in the first source image data is different from the second number of bits allocated to indicate the second color component in the second source image data.

5. The electronic device of claim 1, wherein, to generate the first internal image data, the format convert circuitry configured to:
apply the first color scaling factor to a first portion of the first source image data that indicates the first color component using the first source format to determine color component image data that indicates the first color component based at least in part on the internal format; and
clip the color component image data within an extended internal color range that enables indicating wide color gamut content in the internal format, wherein the extended internal color range comprises an internal color range used to indicate standard color gamut content.

6. The electronic device of claim 5, wherein, to generate the first internal image data when the first source format is an αRGB image data format, the format convert circuitry configured to:
determine an alpha scaling factor associated with an alpha component in the first source image data based at least in part on the first source format;
apply the alpha scaling factor to a second portion of the first source image data that indicates the alpha component using the first source format to determine alpha component image data that indicates the alpha component based at least in part on the internal format; and
clip the alpha component image data within an internal alpha color range determined based at least in part on number of bits the internal format allocates to indicate the alpha component in the first internal image data.

7. The electronic device of claim 1, wherein, to generate the first internal image data, the format convert circuitry is configured to:
map standard color gamut content indicated by the first source image data from a source range associated with the first source format to an internal range associated with the internal format; and
map at least a portion of wide color gamut content indicated by the first source image data from an extended source range that encompasses the source range to an extended internal range that encompasses the internal range when one or more color components indicated by the first source image data falls outside the source range.

8. The electronic device of claim 1, wherein the electronic device comprises a portable phone, a media player, a personal data organizer, a handheld game platform, a tablet device, a computer, or any combination thereof.

9. An electronic device, comprising:
a display panel configured to facilitate display of a first image by controlling luminance of a display pixel based at least in part on first display image data and to facilitate display of a second image by controlling luminance of the display pixel based at least in part on second display image data; and
a display pipeline coupled to the display panel, wherein the display pipeline comprises:
format convert circuitry configured to:
receive first source image data that indicates target luminance of the display pixel in the first image using a first source format, wherein the first source format comprises a fixed point αRGB image data format;
determine a first color scaling factor associated with a first color component in the first source image data based at least in part on the first source format, wherein the first color component comprises one of a red component, a blue component, and a green component;
generate first internal image data that indicates target luminance of the display pixel in the first image using an internal format based at least in part on application of the first color scaling factor to the first source image data;
receive second source image data that indicates target luminance of the display pixel in the second image using a second source format different from the first source format, wherein the second source format comprises a floating point αRGB image data format;
determine a second color scaling factor based at least in part on the second source format, wherein the second color scaling factor is associated with the first color component in the second source image data and different from the first color scaling factor; and
generate second internal image data that indicates target luminance of the display pixel in the second image using the internal format based at least in part on application of the second color scaling factor to the second source image data; and
image data processing circuitry downstream of the format convert circuitry, wherein the image data processing circuitry is configured to generate the first display image data based at least in part on processing of the first internal image data that facilitates improving perceived image quality when the first image is displayed to generate the second display image data based at least in part on processing of the second internal image data that facilitates improving perceived image quality when the second image is displayed.

10. The electronic device of claim 9, wherein the electronic device comprises a portable phone, a media player, a personal data organizer, a handheld game platform, a tablet device, a computer, or any combination thereof.

11. An electronic device, comprising:
a display panel configured to facilitate display of an image by controlling luminance of a display pixel based at least in part on display image data; and
a display pipeline coupled to the display panel, wherein the display pipeline comprises:
format convert circuitry configured to:
receive source image data that indicates target luminance of the display pixel in the image using a source format;
determine a first color scaling factor associated with a first color component in the source image data based at least in part on the source format; and
generate internal image data that indicates target luminance of the display pixel in the image using an internal format based at least in part on application of the first color scaling factor to the source image data, wherein, to generate the internal image data, the format convert circuitry is configured to:
determine a second color scaling factor associated with a second color component in the source image data based at least in part on the source format; and
when content outside a standard color gamut is indicatable by the source image data:
determine a non-zero color offset value associated with each color component in the source image data based at least in part on the source format;
apply the non-zero color offset value followed by the first color scaling factor to a first portion of the source image that indicates the first color component using the source format to determine first color component image data that indicates the first color component based at least in part on the internal format; and
apply the non-zero color offset value followed by the second color scaling factor to a second portion of the source image that indicates the second color component using the first source format to determine a fourth portion of the internal image data that indicates the second color component using the internal format; and
image data processing circuitry downstream of the format convert circuitry, wherein the image data processing circuitry is configured to generate the display image data based at least in part on processing of the internal image data that facilitates improving perceived image quality when the image is displayed.

12. The electronic device of claim 11, wherein the format convert circuitry is configured to determine that content outside the standard color gamut is indicatable by the source image data when:
the source format is a 10-bit fixed point image data format; or
the source format is a floating point image data format.

13. The electronic device of claim 11, wherein:
the first color scaling factor equal to the second color scaling factor when the source format is a first αRGB image data format that allocates a same number of bits to indicate the first color component and the second color component in the source image data; and
the first color scaling factor is different from the second color scaling factor when:
the source format is a second αRGB image data format that allocates a different number of bits to indicate the first color component and the second color component in the source image data; or
the source format is a YCbCr image data format and the first color component is a luma component.

14. The electronic device of claim 11, wherein the electronic device comprises a portable phone, a media player, a personal data organizer, a handheld game platform, a tablet device, a computer, or any combination thereof.

* * * * *

UNITED STATES PATENT AND TRADEMARK OFFICE
CERTIFICATE OF CORRECTION

PATENT NO. : 10,187,622 B1
APPLICATION NO. : 15/699481
DATED : January 22, 2019
INVENTOR(S) : Mahesh B. Chappalli et al.

It is certified that error appears in the above-identified patent and that said Letters Patent is hereby corrected as shown below:

In the Claims

Claim 4, Column 23, Line 9, please insert --that-- between "formal" and "allocates".

Claim 11, Column 26, Line 4, please delete "first".

Claim 13, Column 26, Line 23, please insert --is-- between "factor" and "equal".

Signed and Sealed this
Tenth Day of December, 2019

Andrei Iancu
*Director of the United States Patent and Trademark Office*